(12) United States Patent
Gunning et al.

(10) Patent No.: US 7,839,625 B2
(45) Date of Patent: Nov. 23, 2010

(54) TOOL BELT WITH SMART CELL TECHNOLOGY

(75) Inventors: Brian Gunning, Cedar Rapids, IA (US);
Tom Coppa, Cedar Rapids, IA (US);
Jeremiah Lehr, Cedar Rapids, IA (US)

(73) Assignee: Intermec IP Corp., Beverly Hills, CA (US)

( * ) Notice: Subject to any disclaimer, the term of this patent is extended or adjusted under 35 U.S.C. 154(b) by 1041 days.

(21) Appl. No.: 11/598,388

(22) Filed: Nov. 13, 2006

(65) Prior Publication Data
US 2008/0054062 A1   Mar. 6, 2008

Related U.S. Application Data

(60) Provisional application No. 60/824,461, filed on Sep. 4, 2006.

(51) Int. Cl.
*H05K 7/10* (2006.01)
(52) U.S. Cl. ............................ 361/679.03; 361/679.41; 361/679.09; 361/679.55; 235/375
(58) Field of Classification Search ............ 361/679.03, 361/679.01, 679.41, 679.55; 235/375
See application file for complete search history.

(56) References Cited

U.S. PATENT DOCUMENTS

| 4,748,344 A | * | 5/1988 | Sing ........................... 307/150 |
| 5,914,585 A | * | 6/1999 | Grabon ....................... 320/125 |
| 6,047,301 A | * | 4/2000 | Bjorklund et al. ........... 708/139 |
| 6,249,427 B1 | * | 6/2001 | Carroll .................. 361/679.03 |
| 6,561,845 B2 | * | 5/2003 | Ocheltree et al. ........ 439/540.1 |

* cited by examiner

*Primary Examiner*—Jayprakash N Gandhi
*Assistant Examiner*—Ingrid Wright
(74) *Attorney, Agent, or Firm*—Shook, Hardy & Bacon L.L.P.

(57) ABSTRACT

A tool belt worn by an operator comprises a processor and a plurality of smart sockets. The smart sockets connect various smart cells that perform various functions. The smart cells have a uniform interface to connect to different locations of smart sockets. The smart cells communicate with the processor or each other over a wireless technology or through a data path embedded in the tool belt. Functionality of the tool belt may be extended with an extender that has antennas, lights, speakers, microphones, and additional smart sockets. A data glove extends the functionality of the tool belt further with a glove, smart socket, and smart cell integrated together and used at the operator's hand.

27 Claims, 9 Drawing Sheets

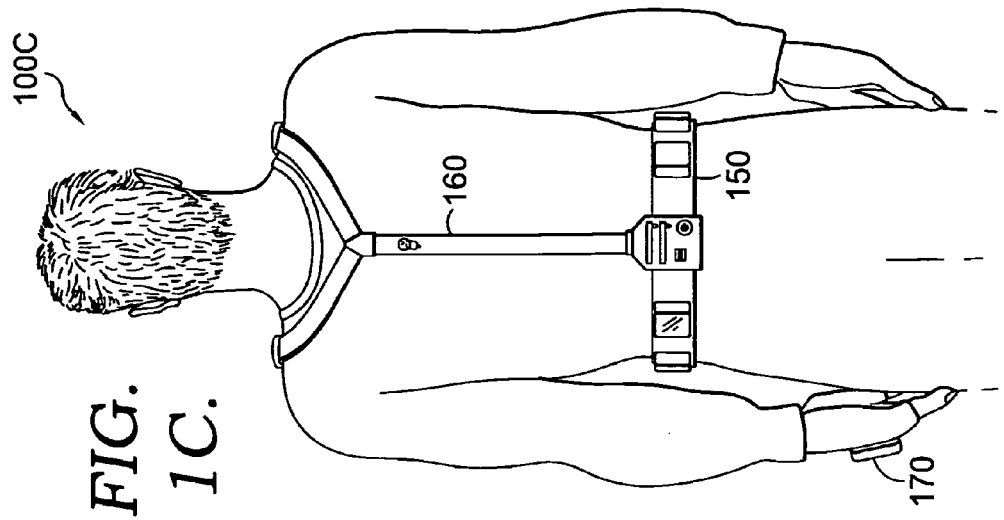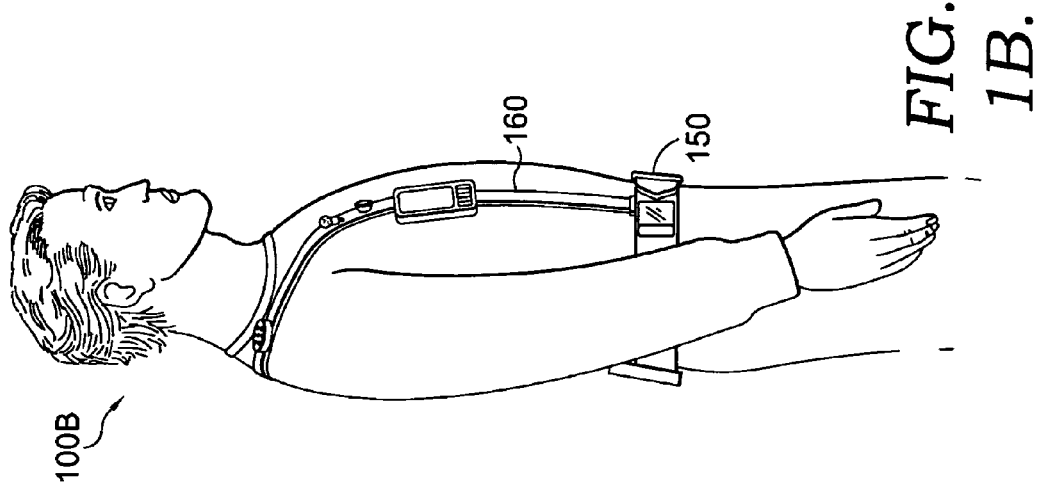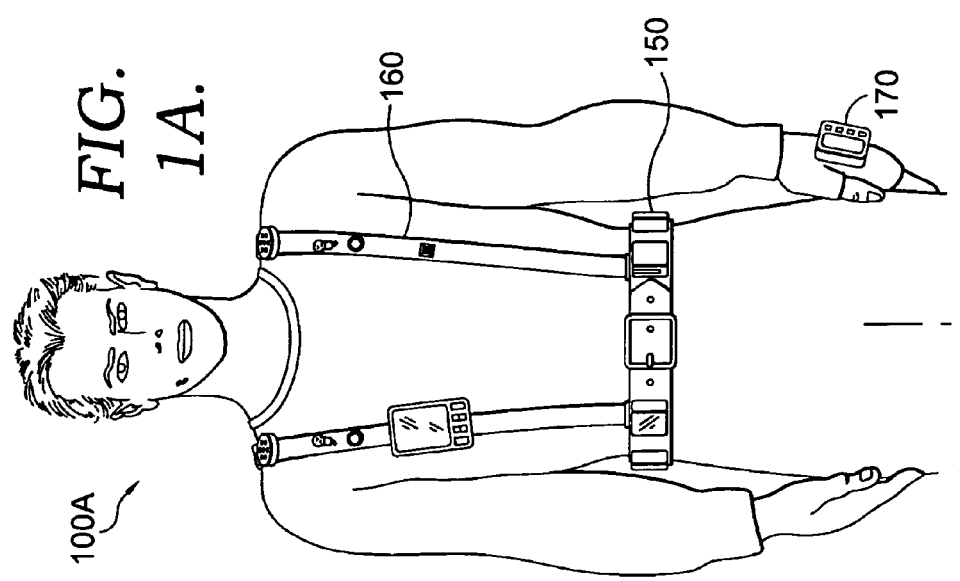

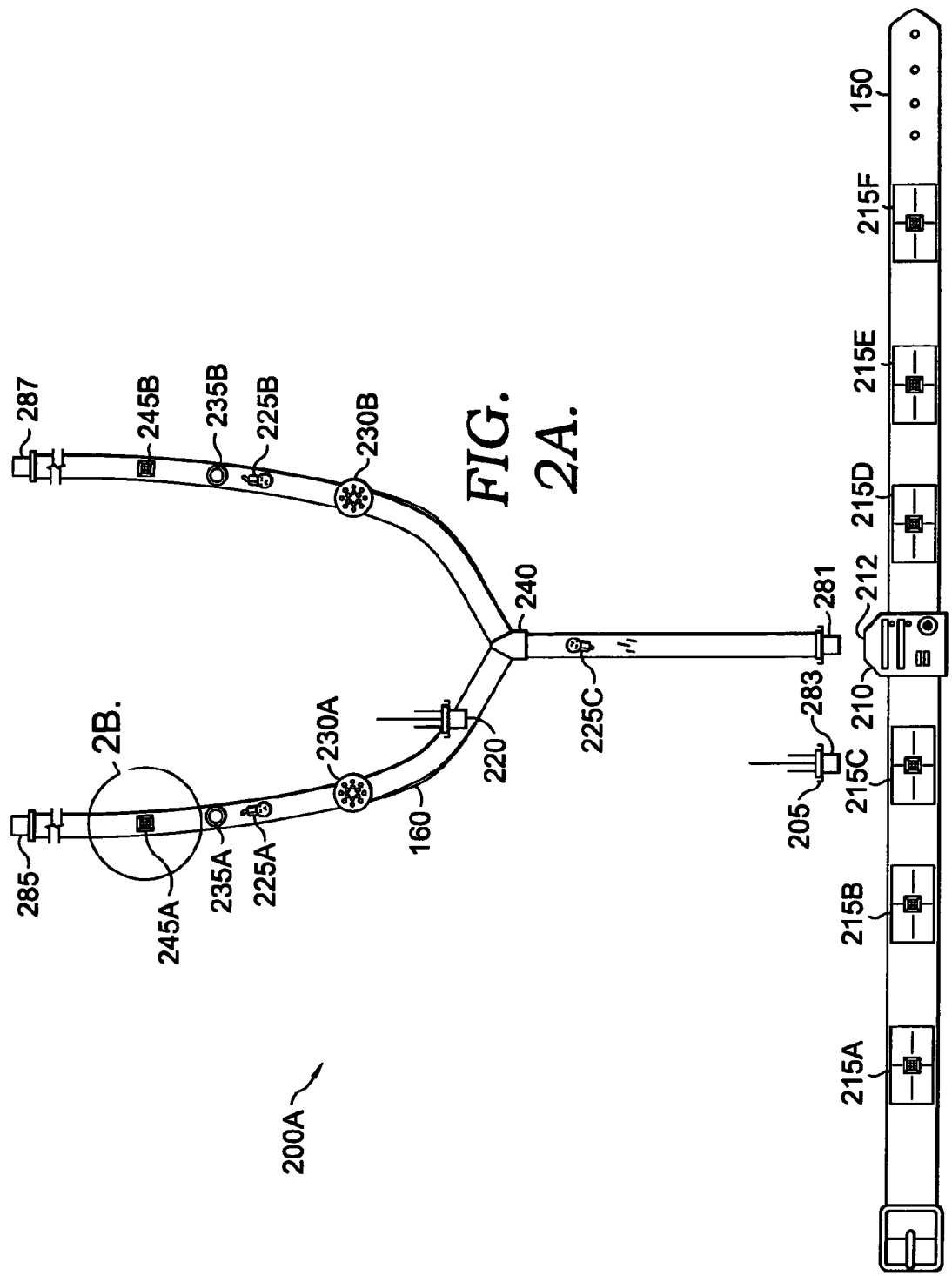

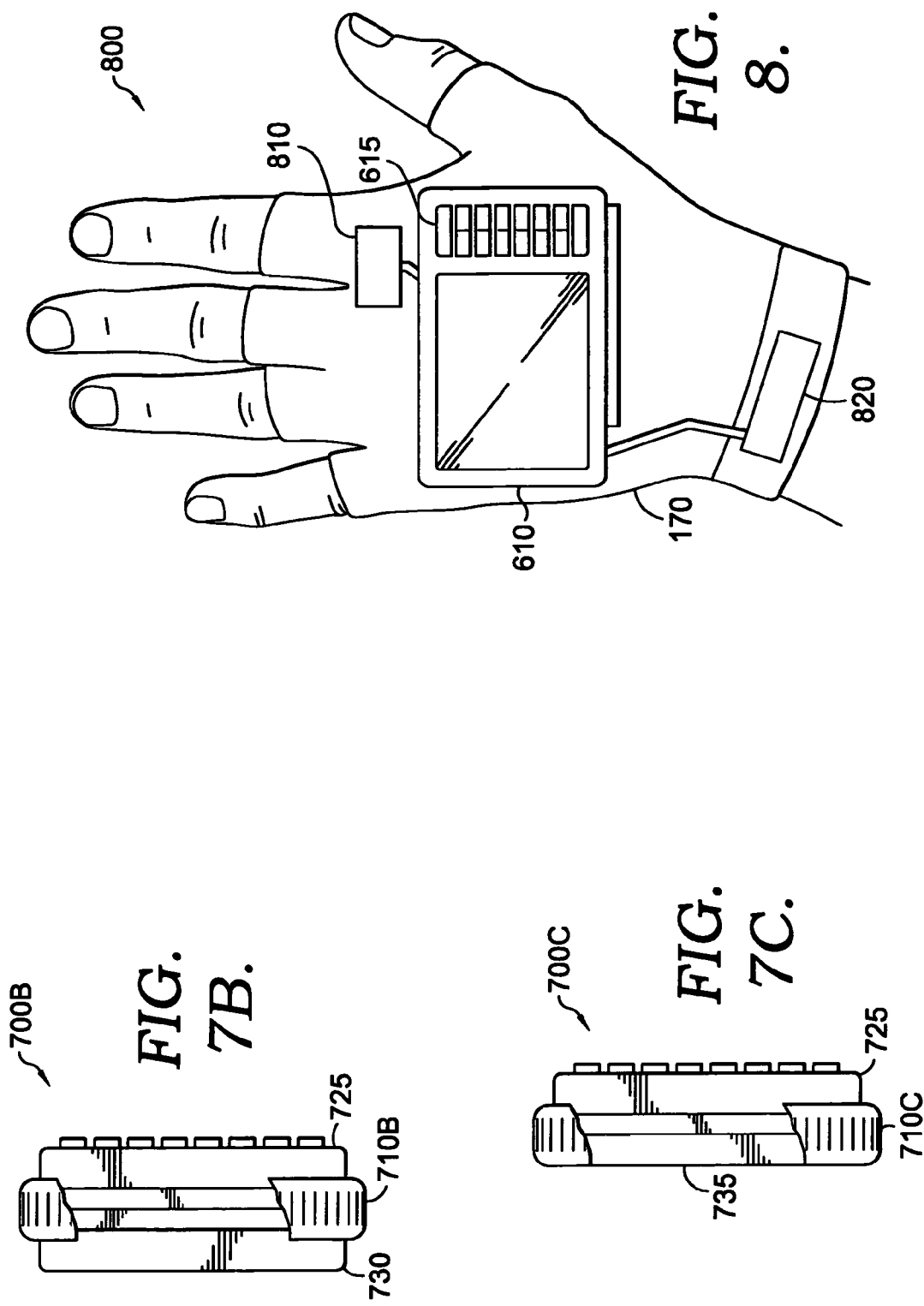

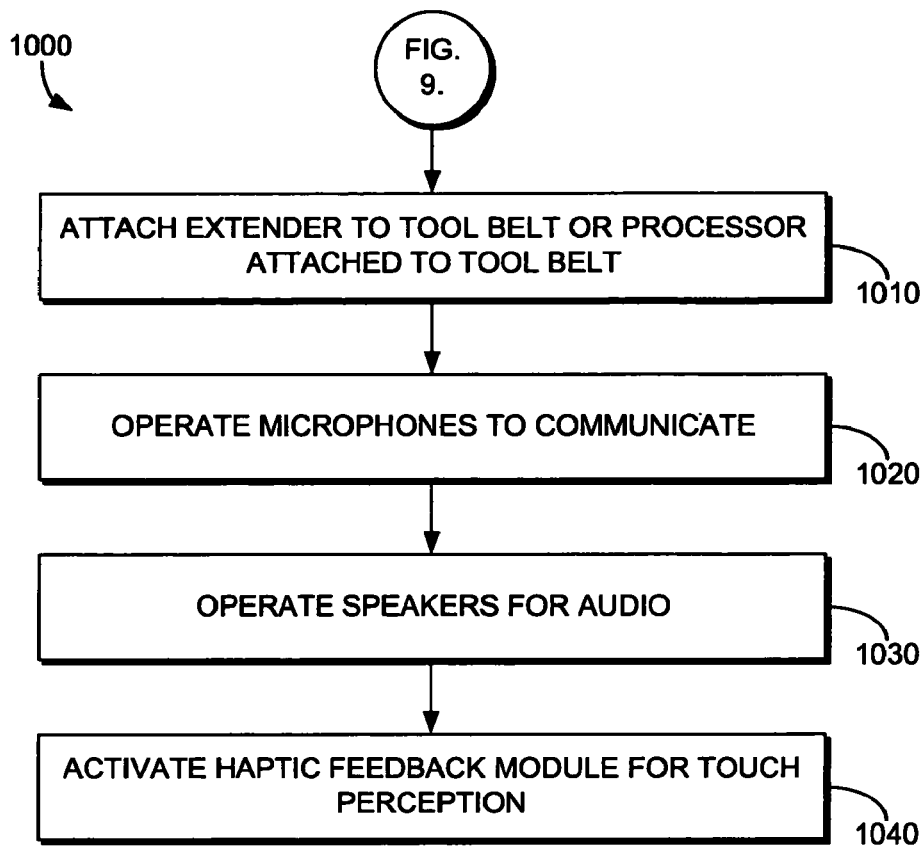
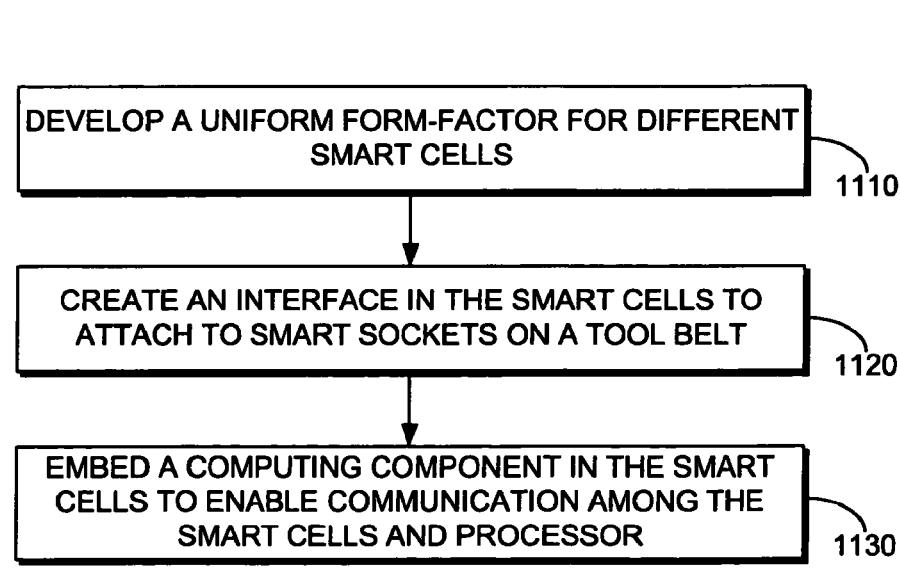

TOOL BELT WITH SMART CELL TECHNOLOGY

CROSS-REFERENCE TO RELATED APPLICATIONS

This application claims the benefit of Application No. 60/824,461, filed Sep. 4, 2006 under 35 USC §119(e), and is herein incorporated by reference.

STATEMENT REGARDING FEDERALLY SPONSORED RESEARCH OR DEVELOPMENT

Not applicable.

BACKGROUND

In various work environments, equipment is needed for a variety of tasks especially where products are involved. Personnel in these environments need access to different equipment in order to perform their jobs. For example, a warehouse work environment may require a worker to keep track of inventory, especially the movement of products into and out of the warehouse. The worker may encounter pressures to be fast and efficient with the disposition of products in the warehouse. The worker may also use a variety of equipment and tools in an ordinary work day. The worker may use a computing device such as a hand-held computer or use a tracking device to register and monitor products in the warehouse. As one may see, the list of equipment that the worker may use in a warehouse environment is numerous. Unfortunately, the demands of moving products and equipment into and out of the warehouse are becoming greater. The worker has to be fast, efficient, and safe in carrying out the tasks that are required in dealing with the warehouse. The worker needs to be in an environment that provides him or her with quick access to the necessary equipment to perform the job function faster. The worker needs to have access to equipment that allows quick verification of job tasks, or allows quick access to data that pertains to the warehouse or products in the warehouse. Even with the above tasks, the worker has to perform the job in a safe manner and in a safe environment. This means that cables and wires connected to the equipment that the worker might use needs to be kept to a minimum. If the worker rides around in the warehouse, the cables and wires can present an acute problem if they get tangled up into items within the warehouse.

One can see the issue of an operator that has to move products around in the warehouse. First, the operator has to know what items are within the warehouse. If a new product comes in, the operator has to log the product and then find an appropriate place to store the product. Once the storage location is identified, the operator has to keep track of the location so that the product can easily be retrieved in the future. From this explanation, the tasks described above may require several persons to get the job done. Today, one person may log all new products that come into the warehouse. A second person may be charged with moving the product and storing it in a location. A third person may be responsible for tracking the location of all of the products in the warehouse. These complex set of tasks may happen numerous times in a day. The tasks do not happen quickly as each person has a defined tasks which must be done before the other person can perform their task.

A similar situation to the warehouse environment may occur in a distribution environment and a transportation and logistics environment. The movement of equipment and products into and out of an environment must be done quickly and efficiently. A worker in these environment needs to be equipped to handled the demands of working fast, tracking materials, keeping updated records, and working with less personnel. In some other situations, the worker needs to operate unencumbered keeping hands and feet free.

With the identified disadvantages of working in today's environment, a solution is needed that allows a worker, operator, or other personnel to work faster, more efficiently, unencumbered, and safely. The solution needs to allow for easy equipment access, portable equipment operation, un-tethered movement, hands-free operation, and multitasking.

SUMMARY

The present invention is defined by the claims below. Embodiments of the present invention solve at least the above problems by providing a tool belt that operates as a device holder, a power bridge, and a network; by providing smart cells that function as a power supply, an output device, or a data collector; and by providing a data glove that enables a hands-free operation.

In a first aspect, a tool belt operating as a device holder, power bridge, and network is provided that includes a processor, with a memory and a networking capability, smart sockets, and a data path. The processor is attached to the tool belt. The smart sockets are coupled to the tool belt in proximity to the processor for securing smart cells in a modular arrangement. The smart sockets are designed with a uniform interface to connect with each of the smart cells. The smart sockets operate to enable a connection with a subset of the smart cells where the subset is a power source. A data path is integrated with the tool belt for connecting the processor and the smart sockets. When a smart cell is inserted into a smart socket, the smart cell is automatically connected to the processor by way of the data path.

In another aspect, smart cells functioning as power supplies, output devices, or data collectors are provided that include an interface and a computing component. The interface attaches to a smart socket located on a tool belt for connecting the smart cells to smart sockets located on the tool belt. The interface is shaped with a uniform form-factor to enable the smart cells to attach to different smart sockets. A computing component operates to communicate with either or both a processor or another computing component in other smart cells.

In yet another aspect, a data glove operates to enable a hands-free operation. The data glove includes a smart socket and an accelerometer. The smart socket secures a smart cell where the smart socket has a uniform interface corresponding to other smart sockets and where the smart cell is a computing device shaped with a uniform form-factor for interfacing with other smart sockets. The accelerometer detects motion.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1A is a front view of an operator wearing an exemplary tool belt with an exemplary extender in an embodiment of the present invention;

FIG. 1B is a side view of the operator wearing the exemplary tool belt with the exemplary extender in an embodiment of the present invention;

FIG. 1C is a back view of the operator wearing the exemplary tool belt with the exemplary extender in an embodiment of the present invention;

FIG. 2A is a diagram of an exemplary tool belt, an exemplary antenna option, and an exemplary extender option implemented in an embodiment of the present invention;

FIG. 7B is a cut-away diagram of the exemplary gasket with smart cells attached illustrating an implementation of an embodiment of the present invention;

FIG. 7C is a cut-away diagram of the exemplary gasket with a smart cell on one side and a protective cover on the other side illustrating an implementation of an embodiment of the present invention;

FIG. 8 is a diagram of an exemplary data glove implemented in an embodiment of the present invention;

FIG. 10 is a flowchart of an exemplary process for operating a tool belt with an extender in an embodiment of the present invention;

FIG. 11 is a flowchart of an exemplary process for developing smart cells for an embodiment of the present invention.

DETAILED DESCRIPTION

Figure 2C:
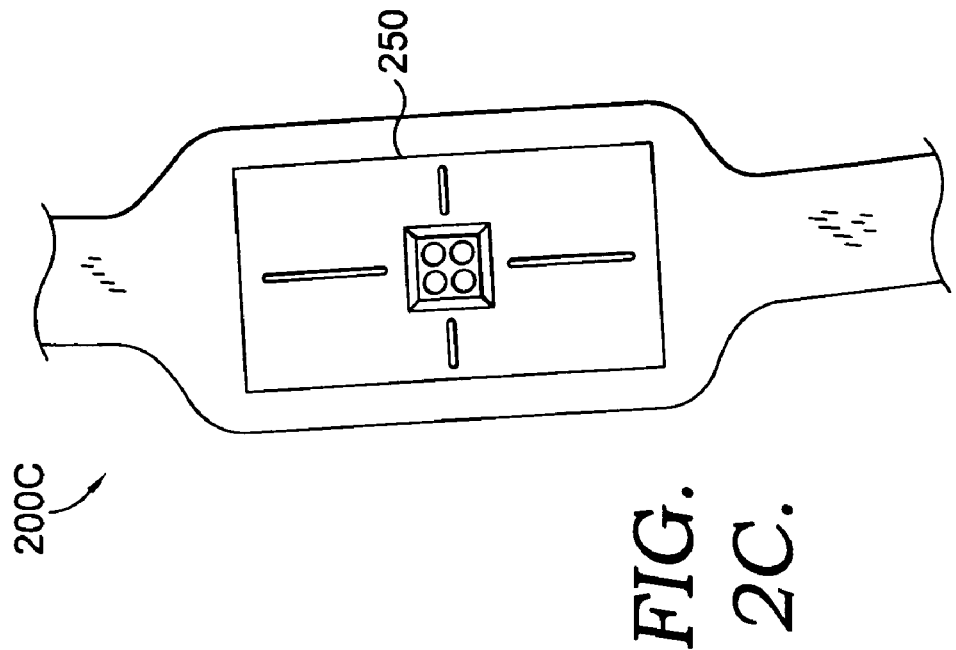
FIG. 2C is a diagram of an alternative embodiment of the smart socket on the tool belt or the extender.

Embodiments of the present invention provide a tool belt with smart cell technology, various smart cells, and a data glove.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 1xRTT | Single Carrier Radio Transmission Technology |
| 3G | Third generation wireless network |
| 4G | Fourth generation wireless network |
| BLUETOOTH | Technology for connecting devices using a short-ranged wireless connection. (802.15 network) |
| CDMA | Code Division Multiple Access |
| EDGE | Enhance Data Rates for GSM (and TDMA) Evolution |
| EV-DO | Evolution Data Only or Evolution Data Optimized |
| GPRS | General Packet Radio Services |
| GSM | Global System for Mobile Communications |
| MBWA | Mobile Broadband Wireless Access or Mobile-Fi. (802.20 network) |
| MEMS | Micro Electro-Mechanical System |
| PDA | Personal Digital Assistant |
| UMTS | Universal Mobile Telephone System |
| UWB | Ultra Wide-Band |
| W-CDMA | Wide Code Division Multiple Access |
| WiFi | Wireless Fidelity (802.11 network) |
| WiMAX | Worldwide Interoperability for Wireless Access (802.16 network) |
| ZIGBEE | Technology for connecting devices using a short-ranged wireless connection. (802.15 network) |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as an apparatus. Accordingly, the embodiments may take the form of a hardware embodiment or an embodiment combining software and hardware.

Tool Belt with Smart Cell Technology

The present invention implements a tool belt with smart cell technology. The tool belt has several accessories that can be attached to it to extend its capabilities. The tool belt is a modular automated data collection device that emphasizes wearable computing components and modular configurations. The accessories include an extender for extending the capabilities of the tool belt and various smart cells that perform a variety of functions. In addition, the tool belt may be used with a data glove. The data glove provides additional functionality to aid a user's performance. The data glove may be used with or without the tool belt.

In FIGS. 1A-1C, an operator wears a tool belt 150 with an extender 160 in 100A, 100B, and 100C. In addition, the operator wears a data glove 170. As shown in FIGS. 1A-1C, tool belt 150 is a belt that fits around the operator's waist. The belt may be created from a number of materials including metal, plastic, nylon, and leather. Furthermore, the belt may be worn in positions other than around the operator's waist. For example, the belt may be draped across the operator's shoulder. In another embodiment, the belt may be secured around the operator's leg or arm. The idea here is to illustrate that the tool belt 150 may be implemented in various embodiments and used in various positions not shown in FIGS. 1A-1C.

Extender 160 may be created from a number of materials similar to tool belt 150. A description of the various components shown attached to extender 160 shall be discussed in more detail in FIG. 2A. Likewise, details of tool belt 150 shall be discussed in FIG. 2A as well.

In FIGS. 1A and 1C, the operator is shown wearing data glove 170. Data glove 170 fits on the operator's hand to give the operator more functionality for tasks to be performed. More details of data glove 170 shall be discussed further in FIG. 8.

Turning now to FIG. 2A, tool belt 150, extender 160, and an antenna 205 are shown in 200A. Tool belt 150 includes a processor 210 and a variable number of smart sockets 215 identified as 215A-215F. Processor 210 has a receptacle 212 for connecting accessories to tool belt 150 such as extender 160 and antenna 205.

Processor 210 can be a computing device such as a computer, server, or special application device. Processor 210 has a memory for the storage of information and has a networking capability. Processor 210 may communicate with other devices including devices that are attached to tool belt 150 using a wireless technology. Examples of wireless technologies may include 3G and 4G wireless technologies and the IEEE series of wireless technologies. More particular, processor 210 may communicate over a CDMA, EDGE, EV-DO, GPRS, GSM, UMTS, W-CDMA, or 1xRTT network as well as an IEEE 802.11 (WiFi), 802.15 (Bluetooth and Zigbee), 802.16 (WiMAX), or 802.20 (MBWA) network. The list of wireless technologies is not limited to the ones here and may include other UWB radio signals.

Processor 210 includes computer-storage media, or machine-readable media, including media implemented in any method or technology for storing information. Examples of stored information can include computer-useable instructions, data structures, program modules, and other data representations. Computer-storage media can include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Smart sockets 215A-215F attach to tool belt 150 and provide ease of reach to the operator for devices connected to it. Devices connect to smart sockets through a mounting system located on each smart socket. Smart sockets 215A-215F are orientated on the tool belt to be outwardly facing. In FIG. 2A, six smart sockets are shown in tool belt 150. However, this illustration is merely exemplary and any number of smart sockets may be implemented. For example, a police department, a utility company, or a construction company might reduce the number of smart sockets to make way for other tools needed on a job.

Smart sockets 215A-215F are designed to have a uniform form-factor. The uniform form-factor means that the each smart socket has a similar shape externally or internally. This means that a device may interchangeably connect to different smart sockets on tool belt 150. In addition, smart sockets 215A-215F may be located on tool belt 150 in a manner to allow different orientation of devices. For example, a smart socket may swivel on tool belt 150 or rotate in another position.

Although not shown, smart sockets 215A-215F and processor 210 are connected together by a data path. The data path provides both a power link and a data link for the smart sockets and the processor. For example, a smart cell operating as a battery may be plugged to smart socket 215B while a smart cell keyboard may be plugged into smart socket 215D. The battery can supply power to the keyboard through the data path. However, because the smart cells can communicate wirelessly, the keyboard can communicate wirelessly to processor 210.

Extender 160 includes a number of exemplary devices attached or connected to it to extend the capabilities of tool belt 150. The devices that will be discussed here are not the only ones that may be connected to extender 160. The devices discussed here are merely exemplary to detail the functions of extender 160.

Extender 160 may be worn draped across the shoulders of the operator with one end of extender 160 connected to tool belt 150 or processor 210 and the other end(s) connected to tool belt 150 or another material of the operator. The illustrated view of extender 160 is shaped similar to a pair of suspenders. However, another embodiment may be implemented in another shape that can be worn by the operator.

In FIG. 2A, extender 160 has an antenna 220, a set of microphones 225A-225C, a pair of speakers 230A and 230B, a pair of lights 235A and 235B, a haptic feedback module 240, smart sockets 245A and 245B, a coupler 281, and connectors 285 and 287. Antenna 220 provides a communication connection for tool belt 150. Antenna 220 may include several individual antennas positioned together. Processor 210 and devices attached to tool belt 150 can communicate wirelessly as discussed earlier in FIG. 1. These devices may use antenna 220 to communicate with other devices or with each other. These devices may also have their own built-in antenna.

A set of microphones 225A-225C are dispersed throughout each leg of extender 160. Two microphones are positioned on the front of the operator when extender 160 is worn and the third microphone is positioned on the back of the operator. The set of microphones 225A-225C provides the operator with a way to communicate or record sound including verbal commands. Furthermore, the microphones, based on their spatial location, can be used to provide zone noise cancellation to the operator.

A pair of speakers 230A and 230B is positioned on extender 160 to provide the operator with audible sound. In some embodiments, the speakers are located on extender 160 near the operator's shoulders. The speakers can provide audible instructions as well as other information applicable to the operator's environment. In addition, the speakers can provide environmental sound cancellations where appropriate and defined by the operator.

A pair of lights 235A and 235B is located on extender 160 to provide better visibility for the operator. Depending on the implementation of the embodiment, the lights can vary in size, shape, and color. In one embodiment, lights 235A and 235B can provide directional lighting to focus lighting in a particular direction for the operator's view. In another embodiment, lights 235A and 235B are safety lights to enable the operator to be seen by others, especially in a hazardous environment.

Haptic feedback module 240 is located on the back of the operator when extender 160 is worn. Haptic feedback module 240 provides a sensory feedback to the operator. For example, if the operator's mobile phone is set to vibrate in a ring mode, the vibration sensation can be communicated to the operator with haptic feedback module 240.

Smart sockets 245A and 245B are located on extender 160. In FIG. 2A, smart sockets 245A and 245B are positioned on the front of the operator when extender 160 is worn. However, in another embodiment, smart sockets 245A and 245B can be positioned on the back of the operator. Smart sockets 245A and 245B have the same functionality as smart sockets 215A-215F.

In an embodiment of the present invention, extender 160 performs as an accessory to tool belt 150. The connection of extender 160 to tool belt 150 may be done by inserting coupler 281 into receptacle 212. With this connection, the data path discussed in tool belt 150 may be extended throughout extender 160 providing an electrical connection as well as a data connection to smart sockets 245A and 245B and other devices on extender 160. However, in another embodiment of the present invention, extender 160 may be used without a connection to tool belt 150. In this embodiment, extender 160 can be connected to the material of the operator such as the operator's pants. Coupler 281 and connectors 285 and 287 can have a catch device to hold extender 160 to the material. In this configuration, a power source can be plugged into one of the smart sockets 245A and 245B to provide power to either the lights 235A and 235B, a smart cell plugged into the other of the smart sockets 245A and 245B, or other devices connected to extender 160.

In another embodiment of the present invention, the operator may choose not to use extender 160. In this embodiment, antenna 205 can be coupled to processor 210 by inserting coupler 283 into receptacle 212. Similar to the functions of antenna 220, antenna 205 provides communication access for processor 210 and the various devices on tool belt 150. Antenna 205 also represents several antennas that may be grouped together.

Figure 2B:
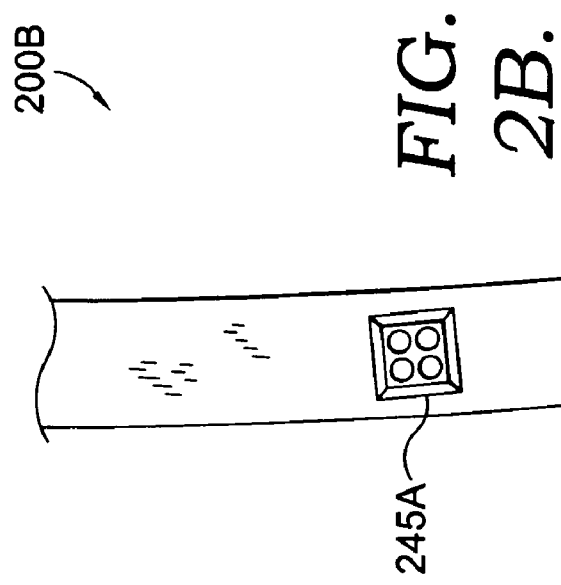
FIG. 2B is a diagram of an expanded section of the tool belt or the extender illustrating a detail of a smart socket in an embodiment of the present invention.

In FIG. 2B, an expanded view of smart socket 245A is shown in 200B. Smart socket 245A may be orientated to handle different types of smart cells. The view of smart socket 245A is merely exemplary and another configuration of smart socket 245A may be implemented in another embodiment. For example, in FIG. 2C, another embodiment of smart socket 245A is represented by smart socket 250.

The operating flexibility of tool belt 150 and extender 160 may be extended with smart cells. Smart cells are peripherals with a standardized form-factor. Smart cells vary greatly in their development and may be created for specific tasks. In an embodiment of the present invention, smart cells are grouped into three varieties: power source, audio and video, and data collection. Other varieties may be created by implementing alternative embodiments. In the power source category, a smart cell may come in the form of a battery, a trickle charger, a kineticell, an alkaline booster, or a port extender for a USB, serial, or ethernet connection. In the audio and video category, a smart cell may come in the form of a touch screen display, an audio unit, or a printer. In the data collection category, a smart cell may come in the form of a barcode scanner, a keyboard, or a magnetic strip reader. The types of smart cells are not limited to the ones listed above. However, smart cells have the standardized form-factor to enable them to connect to the various smart sockets on tool belt 150 and extender 160. In many cases, this is a standardized mounting form-factor.

Figure 3B:
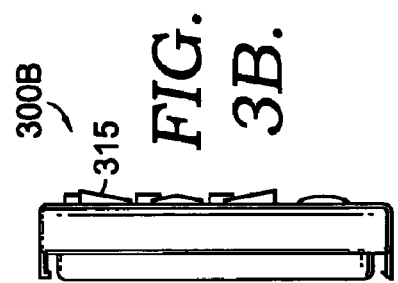
FIG. 3B is a diagram of a side view of the exemplary smart cell keyboard implemented in the embodiment of the present invention.
Figure 3A:
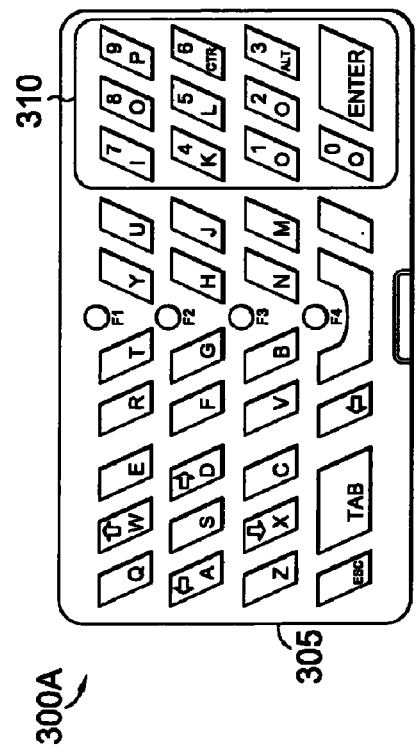
FIG. 3A is a diagram of a top view of an exemplary smart cell keyboard implemented in an embodiment of the present invention.

Turning now to FIG. 3A, a top view of a smart cell keyboard 305 is shown in 300A. FIG. 3A illustrates an exemplary keyboard with stadium-beveled keys with a left/right key orientation. Numeric keys 310 include a 10-key keypad that overlaps with the alphanumeric keys of keyboard 305. The keys of keyboard 305 can be implemented with a backlight to aid the operator. Keyboard 305 is implemented with a cantilevered latch and hook design to allow the keyboard to be docked facing up or down when connected to a smart socket.

In FIG. 3B, a side view of keyboard 305 is shown in 300B as view 315. View 315 illustrates an exemplary orientation of the keys in their stadium layout. The keys are raised and angled to facilitate easy typing. Also, view 305 shows the cantilevered latch and hook design as discussed in FIG. 3A to show how keyboard 305 may be connected to a smart socket.

Figure 3C:
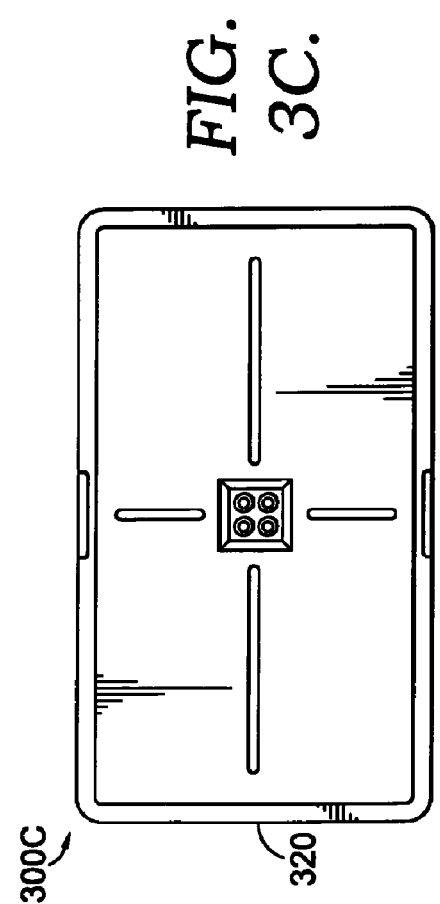
FIG. 3C is a bottom view illustrating an exemplary uniform interface for various smart cells.

In FIG. 3C, a view of uniform interface 320 is shown in 300C. Uniform interface 320 represents the back side of a smart cell regardless of the smart cell's design or functionality. Uniform interface 320 contains an internal battery to power the smart cell, recessed power and pins to connect with the smart socket, indentations to align and secure the smart cell, and wireless capability to communicate in a wireless network.

Figure 4:
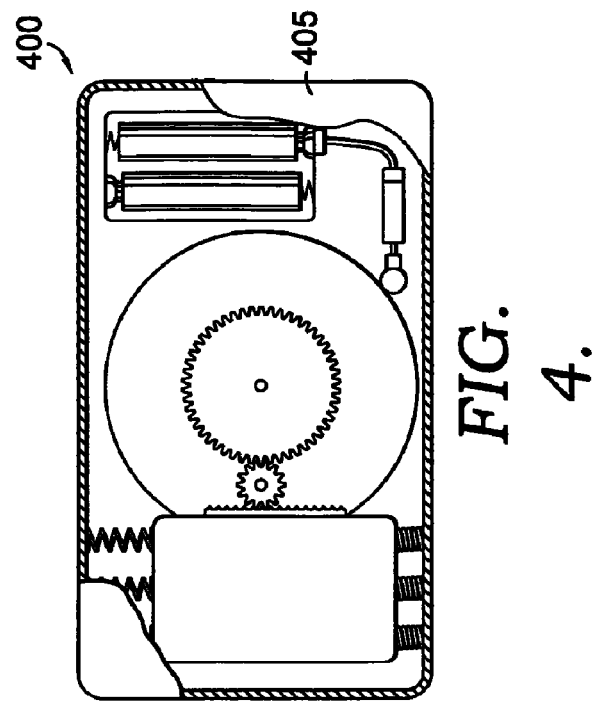
FIG. 4 is a diagram of an exemplary smart cell illustrated as a kineticell.

Turning now to FIG. 4, a smart cell kineticell 405 is shown in 400. Kineticell 405 provides a power source that can power tool belt 150. Kineteicell 405 may be identified as a battery fed by a dynamo. Kineticell 405 can provide power to a system by using kinetic power to run a flywheel. The flywheel turns a dynamo at numerous revolutions per minute, charging a battery.

Figure 5:
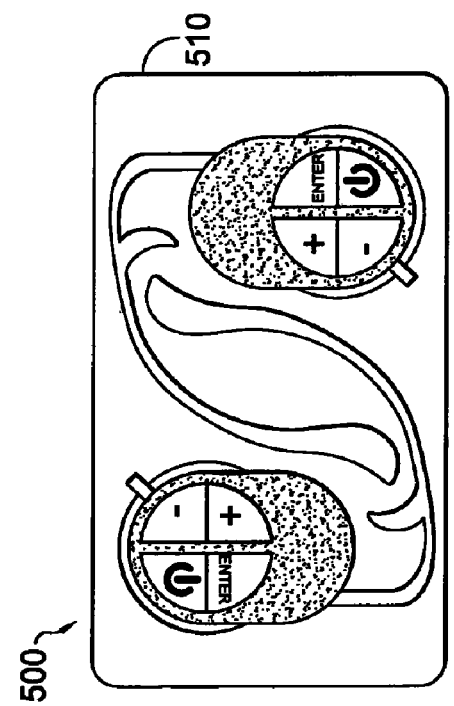
FIG. 5 is a diagram of an exemplary smart cell illustrated as a bone conduction headset.

In FIG. 5, a smart cell bone conduction headset 510 is shown in 500. Headset 510 receives power and charges its internal battery when connected to a smart socket. Headset 510 uses bone conduction to transfer sound, leaving the outer-ear open to the reception of other sounds. Headset 510 may be used for both hearing impaired and non-hearing impaired persons. Headset 510 can be used as an intercom unit between multiple users even when only one user is wearing tool belt 150. Also, each earpiece of the headset can be tuned to different audio sources allowing the user to simultaneously respond to environmental sounds, a coworker, or a service call, for example.

Figure 6:
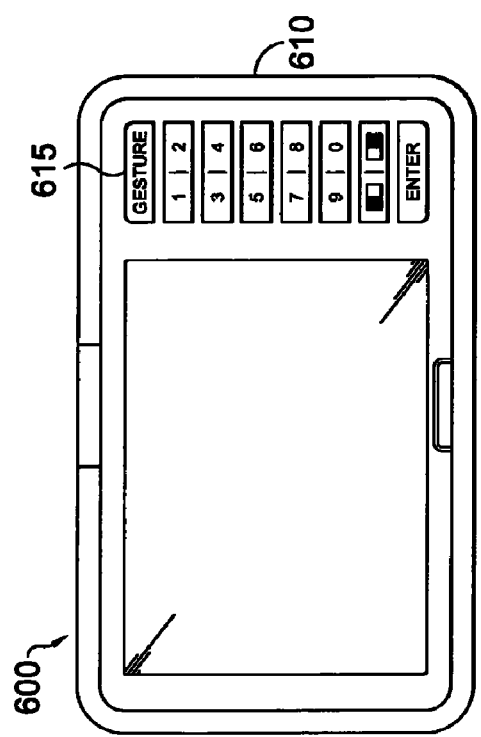
FIG. 6 is a diagram of an exemplary smart cell illustrated with a display and an embedded accelerometer.

In FIG. 6, a smart cell display 610 is shown in 600. Display 610 includes an accelerometer 615. Display 610 has a touch screen in one embodiment to allow information exchange between the operator and computing data. Accelerometer 615 receives motion input from actions such as hand gestures to perform tasks or to transfer input to a smart cell or a computing device. Motion input through accelerometer 615 is used to navigate menus, activate features, or control aspects of the work environment with just one hand, while keeping both hands free. In another embodiment, display 610 may include a video display only. Display 610 can be mounted on a smart socket located in tool belt 150, extender 160, or data glove 170.

Figure 7A:
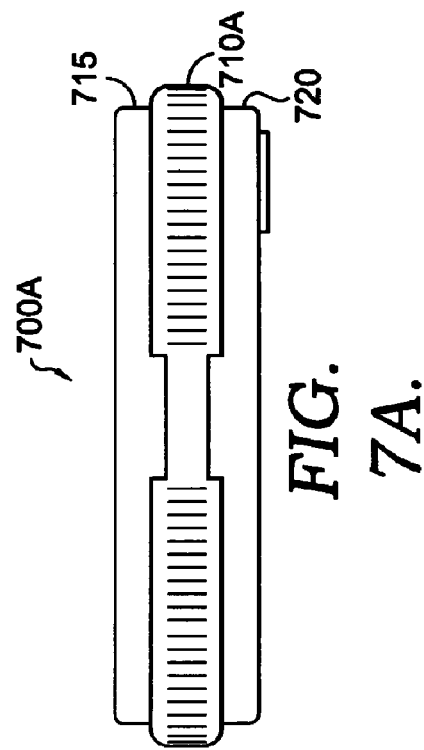
FIG. 7A is a diagram of an exemplary gasket with smart cells attached illustrating an implementation of an embodiment of the present invention.

In FIG. 7A, a smart cell gasket 710A is shown with two smart cells, 715 and 720, connected to it in 700A. Gasket 710A can accommodate different smart cells by incorporating uniform interface 320 on both sides. Smart cells can be docked in the gasket back-to-back. This configuration allows smart cells to be paired. For example, a battery can be docked on one side of gasket 710A with a display 610 being docked on the other side. The battery would provide power to display 610 through gasket 710A. As such, gasket 710A provides an alternative way to use smart cells that are disconnected from tool belt 150.

In FIG. 7B, a side view of gasket 710A is shown in 700B as gasket view 710B. View 700B illustrates a sectional view of how smart cells 725 and 730 connect back-to-back. In FIG. 7C, another side view of gasket 710A is shown in 700C as gasket view 710C. View 710C has smart cell 725 on one side an a protective cover 735 on the other side. Cover 735 protects the exposed elements of gasket 710A and can be used when only one smart cell is used with gasket 710A. For example, some smart cells have an internal battery and do not require an additional battery source. These smart cells can use gasket 710A with cover 735.

Turning now to FIG. 8, data glove 170 is shown in 800 with display 610, accelerometer 615, a scanner 810, and a power pack 820. Data glove 170 can be a fingerless glove or other type of glove with an integrated smart socket (not shown). Display 610 is an exemplary smart cell that plugs into the smart socket. Data glove 170 can communicate wirelessly with devices located on tool belt 150 and extender 160.

Data glove 170 can be implemented with a different smart cell than display 610. However, display 610 with accelerometer 615 provides a convenience to the operator to allow hands-free operation. The operator may use hand gestures that are detected by accelerometer 615 to input instructions or commands into display 610 or devices networked to data glove 170. The hand gestures may be user-configured so that certain hand movements are detected and understood by accelerometer 615. For example, a hand gesture may be configured to turn on scanner 810. Other gestures can be configured to enable or disable scanning by scanner 810. As an exemplary illustration, scanner 810 can be powered by power pack 820.

FIG. 8 illustrates an exemplary use for data glove 170. However, other embodiments incorporating different smart cells and devices may be implemented for the present invention.

Figure 9:
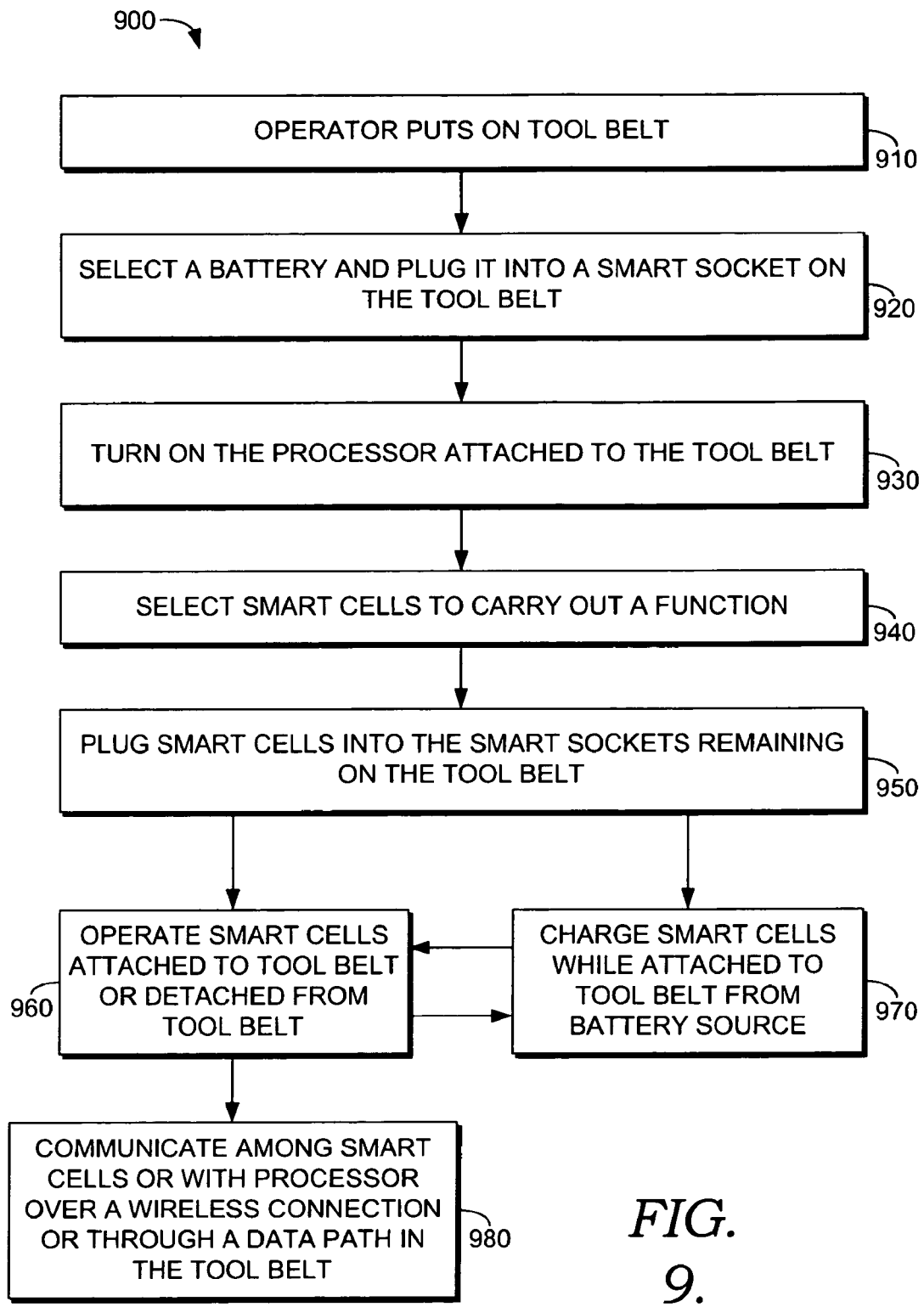
FIG. 9 is a flowchart of an exemplary process for operating a tool belt in an embodiment of the present invention.

Turning now to FIG. 9, a process for operating tool belt 150 is shown in a method 900. In a step 910, an operator puts on tool belt 150. In a step 920, the operator selects a smart cell battery and plugs it into a smart socket located on tool belt 150. In a step 930, processor 210 is turned on. In a step 940, one or more smart cells are selected by the operator based on the task to be accomplished. In a step 950, the smart cells are plugged into the smart sockets (215A-215F) remaining on tool belt 150. Since the battery used one of the smart sockets, the remaining smart sockets are available for use by other smart cells. In a step 960, the smart cells are operated while attached to or detached from tool belt 150. In a step 970, the smart cells are charged while plugged in the smart sockets. The battery provides the power that enables the charging of the smart cells. In a step 980, the smart cells communicate together or with processor 210 over a wireless connection as a primary network or through a data path in tool belt 150 as a secondary network.

In FIG. 10, a process for operating tool belt 150 with extender 160 is shown in a method 1000. Continuing from FIG. 9, in a step 1010, extender 160 is attached to tool belt 150 or processor 210. In a step 1020, microphones 225A-225C operate to receive or record communication. In a step 1030, speakers 230A and 230B provide audio. In a step 1040, haptic feedback module 240 is activated for receiving touch perception in the form of feedback.

In FIG. 11, a process for developing smart cells is provided in a method 1100. In a step 1110, a uniform or standardized form-factor is developed for different smart cells. In a step 1120, an interface 320 is created in the smart cells to attach to smart sockets (215A-215F) on tool belt 150. In a step 1130, a computing component is embedded in the smart cells to enable communications among the smart cells and processor 210.

Figure 12:
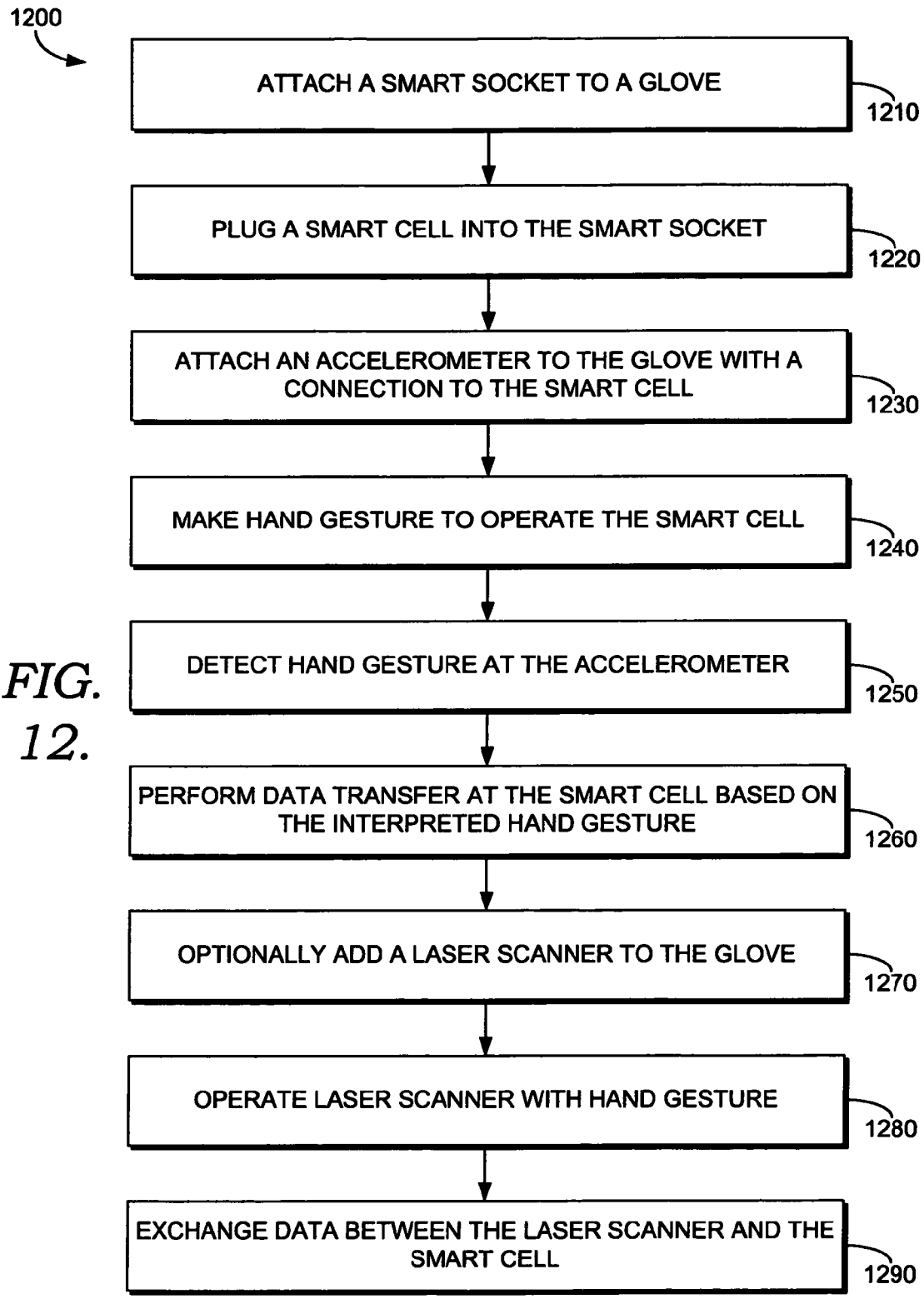
FIG. 12 is a flowchart of an exemplary process for operating a data glove in an embodiment of the present invention.

In FIG. 12, a process for operating data glove 170 is shown in a method 1200. In a step 1210, a smart socket is attached to a glove. In a step 1220, a smart cell such as display 610 is plugged into the smart socket. In a step 1230, accelerometer 615 is attached to the glove with a connection to or integration with the smart cell (display 610). In a step 1240, the operator makes a hand gesture to operate the smart cell. In a step 1250, the hand gesture is detected at accelerometer 615. In a step 1260, a data transfer is performed at the smart cell based on the interpreted hand gesture. In a step 1270, an optional laser scanner 810 is added to the glove. In a step 1280, laser scanner 810 operates with a hand gesture. In a step 1290, data is exchanged between laser scanner 810 and the smart cell (display 610).

The prior discussion is only for illustrative purposes to convey exemplary embodiments. The steps discussed in FIGS. 9-12 may be executed without regards to order. Some steps may be omitted and some steps may be executed at a different time than shown. For example, step 970 may be executed before step 960. Step 1040 may be executed before step 1020. The point here is to convey that the figures are merely exemplary for the embodiments of the present invention and that other embodiments may be implemented for the present invention.

As discussed above, one can see that the present invention may be implemented and used for a variety of situations. The present invention can be tailored and used for warehouse management, direct store distribution, transportation and logistics, public safety, and government. For example, in warehouse management and direct store distribution, the present invention can facilitate hands-free and voice-prompted operations Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A tool belt operable as a device holder, a power bridge, and a network, comprising:
 a processor, with a memory and a networking capability, attached to the tool belt;
 a plurality of smart sockets coupled to the tool belt in proximity to the processor for securing one or more smart cells in a modular arrangement, designed with a uniform interface to connect with each of the one or more smart cells, and operable to enable a connection with a subset of the one or more smart cells wherein the subset is one or more power sources wherein the one or more smart cells is attached to one or more smart sockets of the plurality of sockets, and wherein the plurality of sockets coupled to the tool belt have a latch system to orientate each of the plurality of sockets into different directions; and
 a data path integrated with the tool belt for connecting the processor and the plurality of smart sockets.

2. The tool belt of claim 1, wherein the one or more smart cells communicate at least one with the processor and each other.

3. The tool belt of claim 2, wherein the one or more smart cells and the processor communicate using a wireless technology.

4. The tool belt of claim 3, wherein the wireless technology is selected from a group including UWB, IEEE 802.11, IEEE 802.15, IEEE 802.16, and IEEE 802.20.

5. The tool belt of claim 2, wherein the one or more smart cells and the processor communicate using the data path.

6. The tool belt of claim 1, further comprising the one or more power sources attached to a set of the plurality of sockets wherein the one or more power sources power the tool belt.

7. The tool belt of claim 6, wherein the one or more power sources are selected from a group including a battery, a booster pack, a trickle charger, and a kineticell.

8. The tool belt of claim 1, further comprising the one or more power sources attached to a first set of the plurality of sockets wherein the one or more power sources charge the one or more smart cells that are not power sources but are attached to a second set of the plurality of sockets.

9. The tool belt of claim 8, wherein the one or more power sources are selected from a group including a battery, a booster pack, a trickle charger, and a kineticell.

10. The tool belt of claim 1, further comprising at least one antenna attachable to the processor or the tool belt for communicating over a wireless technology.

11. The tool belt of claim 1, further comprising a wearable extender attachable to the processor or the tool belt for extending one or more functions of the tool belt.

12. The tool belt of claim 11, further comprising at least one of a first set of microphones, a second set of speakers, a third set of lights, a fourth set of smart sockets, and a haptic feedback module coupled to the extender.

13. The tool belt of claim 12, further comprising one or more antennas integrated with the extender for communicating over a wireless technology wherein the one or more antennas connect to at least one of the processor and a smart socket.

14. The tool belt of claim 13, wherein the extender is shaped in a form of a set of suspenders and is worn attached to either the processor or the tool belt.

15. The tool belt of claim 14, wherein the one or more antennas are located in proximity of a shoulder of a wearer of the extender.

16. The tool belt of claim 15, wherein the first set of microphones comprises a pair of microphones located about the extender in a frontal position extending outward from the wearer and one microphone located about the extender in a back position extending outward from the wearer.

17. The tool belt of claim 16, wherein the second set of speakers is mounted on the tool belt about the shoulder of the wearer.

18. One or more smart cells functioning as a power supply, an output device, or a data collector, comprising:
    an interface on the one or more smart cells attachable to a smart socket located on a tool belt for connecting the one or more smart cells to one or more smart sockets located on the tool belt;
    the interface shaped with a uniform form-factor to enable the one or more smart cells to attach to different smart sockets;
    a latch system on the one or more smart cells, wherein the latch system connects to the one or more smart sockets or to each other wherein the one or more smart cells can orientate in different directions latched to the one or more smart sockets; and
    a computing component in the one or more smart cells operable to communicate with at least one of a processor or another computing component in another one or more smart cells.

19. The smart cells of claim 18, further comprising the one or more smart cells operable to provide a power to the tool belt.

20. The smart cells of claim 18, further comprising the one or more smart cells containing a set of batteries for operating and for receiving a charge.

21. The smart cells of claim 18, further comprising the one or more smart cells operable to communicate using a wireless technology.

22. The smart cells of claim 21, wherein the wireless technology is selected from a group including UWB, IEEE 802.11, IEEE 802.15, IEEE 802.16, and IEEE 802.20.

23. The smart cells of claim 18, further comprising the one or more smart cells connected to the one or more smart sockets located on the tool belt.

24. The smart cells of claim 18, wherein the one or more smart cells connect to each other through a gasket.

25. The smart cells of claims 18, further comprising a smart cell formed as a keyboard comprising:
    a set of raised keys disposed on the keyboard such that a first half of the keyboard has a top face of approximately a first set of keys angled towards the right edge of the keyboard and a second half of the keyboard has the top face of approximately a second set of keys angled towards the left edge of the keyboard; and
    a cantilevered latch operable to connect the keyboard to a smart socket.

26. The smart cells of claim 18, further comprising a smart cell formed as a printer.

27. The smart cells of claim 18, further comprising a smart cell formed as a gasket, comprising a double-sided interface for connecting at least one of a smart cell, a battery, and a cover on either side of the gasket.

* * * * *